United States Patent [19]

Warrior et al.

[11] Patent Number: 5,642,301

[45] Date of Patent: Jun. 24, 1997

[54] TRANSMITTER WITH IMPROVED COMPENSATION

[75] Inventors: Jogesh Warrior, Chanhassen; Scott E. Brigham, St. Paul; Gary A. Lenz, Eden Prairie, all of Minn.

[73] Assignee: Rosemount Inc., Eden Prairie, Minn.

[21] Appl. No.: 186,288

[22] Filed: Jan. 25, 1994

[51] Int. Cl.$^6$ ............................................. G01F 1/08
[52] U.S. Cl. ........................ 364/571.02; 364/571.01; 364/138; 395/3; 395/61; 395/900; 395/906
[58] Field of Search ........................ 364/571.01, 571.02, 364/553, 554, 550, 162, 148, 510, 551.01, 557, 558, 138, 139; 395/3, 61, 900, 906, 10, 908, 904, 907, 912, 914, 915, 932; 73/861.01, 861.48, 497, 861.02, 861.03; 340/870.03, 870.06, 870.11–870.14, 870.17, 870.3, 500, 501, 307, 825.06

[56] References Cited

U.S. PATENT DOCUMENTS

| | | | |
|---|---|---|---|
| 4,161,880 | 7/1979 | Prosky | 73/342 |
| 4,437,164 | 3/1984 | Branch, III | 364/571 |
| 4,926,364 | 5/1990 | Brotherton | 364/571.02 |
| 5,043,862 | 8/1991 | Takahashi et al. | 364/162 |
| 5,083,288 | 1/1992 | Somlyody et al. | 364/571.01 |
| 5,161,110 | 11/1992 | Dorchak | 364/468 |
| 5,186,150 | 2/1993 | Sehine | 395/906 |
| 5,214,576 | 5/1993 | Tani et al. | 395/906 |
| 5,241,651 | 8/1993 | Ueda | 395/906 |
| 5,353,380 | 10/1994 | Zhang | 395/3 |
| 5,357,879 | 10/1994 | Shiono et al. | 395/61 |

FOREIGN PATENT DOCUMENTS

| | | | |
|---|---|---|---|
| 0 363 958 A2 | 4/1990 | European Pat. Off. | F02D 41/34 |
| 2133215 | 5/1990 | Japan | B60G 17/015 |
| 2 251 092 | 6/1992 | United Kingdom . | |

OTHER PUBLICATIONS

"The Application of Fuzzy Control Systems to Industrial Processes," P.J. King et al., *Automatica*, vol. 13, 1977, pp. 235–242.

"A Control Engineering Review of Fuzzy Systems," R.M. Tong, *Automatica*, vol. 13, 1977, pp. 559–569.

"Development of Fuzzy Algorithms for Servo Systems," Y.F. Li et al., *IEEE Control Systems Magazine*, Apr. 1989, pp. 65–71.

"Fuzzy Logic Issues for Process Control," M. Spinrad et al., Honeywell Inc., ISA Paper, 1990, Document No. 0065-2814/90/1123-1128.

"Fuzzy Logic in Control Systems: Fuzzy Logic Controller—Part I, Part II" C.C. Lee, *IEEE Transactions on Systems, Man, and Cybernetics*, vol. 20, No. 2, Mar./Apr. 1990, pp. 404–435.

(List continued on next page.)

*Primary Examiner*—Emanuel T. Voeltz
*Assistant Examiner*—Hal D. Wachsman
*Attorney, Agent, or Firm*—Westman, Champlin & Kelly, P.A.

[57] ABSTRACT

A circuit for compensating variables in a measurement transmitter. Within the transmitter, a sensor senses a primary process variable such as differential pressure and a converter digitizes the sensed process variable. The sensor senses pressures within a span of pressures values. A memory inside the transmitter stores at least two membership functions, each membership function having a non-zero value over a predetermined region of the process variable span and a substantially zero value over the remainder of the span. The memory also stores a set of compensation formulas, each formula corresponding to a membership function. A selection circuit in the transmitter selects those membership functions which have a non-zero value at the digitized process variable and a correction circuit provides at least one correction value, each correction value calculated from a compensation formula corresponding to a selected membership function. A weighting circuit multiplies each correction value by its corresponding selected membership function, and combines the multiplicands to provide a compensated process variable. The compensated process variable is coupled to a control circuit connecting the transmitter to a control system.

96 Claims, 8 Drawing Sheets

OTHER PUBLICATIONS

News Release: Omron Electronics, Inc., Schaumburg IL, Jul. 20, 1991.

"Fuzzy Logic Improves on PID Tuning," K. Parker *Chemical Processing,* Oct. 1991, pp. 31–32.

"Fuzzy–Logic Basics: Intuitive Rules Replace Complex Math," D. Brubaker, *EDN,* Jun. 18, 1992, pp. 111–116.

TRANSMITTER WITH IMPROVED COMPENSATION

BACKGROUND OF THE INVENTION

This invention relates to a technique for compensating a sensed variable, where the variable can be representative of position as in a process automation application, or representative of some other physical variable such as pressure, temperature, pH, optical intensity as in a process control industry application. More particularly, the invention applies to devices, such as transmitters, actuators and positioners, which compensate a sensed variable to provide an output representative of the variable.

There is a need to improve the accuracy with which measurement transmitters and devices with actuated outputs, such as a positioner, compensate outputs representative of process variables. Measurement transmitters sense process variables such as pressure, temperature, flow, pH, position, displacement, velocity and the like in a process control or process automation installation. Transmitters have analog-to-digital (A/D) converters for digitizing sensor outputs representative of sensed process variable and a compensation circuit for compensating the repeatable errors in the digitized process variable outputs. Temperature is one of the main sources of the error. The compensation circuit typically comprises a microprocessor which calculates the compensated process variable output with long polynomial functions selected to fit the error characteristics of the sensor over a span of pressures. Constants in the long polynomial function are individually selected to each sensor. During manufacture, individual testing of each sensor generates a set of characterization constants related to the sensor errors which is later stored in a transmitter EEPROM. Using this compensation scheme, process variables can typically be corrected to an accuracy of 0.05% over the span of the primary process variable which the transmitter measures. For example, known pressure transmitters having a span of 0 to 150 inches of water provide corrected pressures within 0.05% accuracy. Limited electrical power and limited time to compute the output make it difficult to complete more complex computation needed to improve accuracy.

Errors in the operating characteristic of the sensor can be a complex, sometimes nonlinear function of many variables. The primary variable (the variable which is compensated), contributes directly to the error, while secondary process variables (which affect the measurement of the primary process variables) contribute indirectly to the error. As the need for accuracy increases, contributions of secondary variables become significant. Current approaches solve this quandary with high order polynomials in multiple process variables, but the resulting equation is arithmetically ill-conditioned and sensitive to the manner in which the polynomial is computed, in that overflows may occur. One transmitter compensation equation is an eleventh order polynomial with approximately 100 terms in three variables, which must be calculated each time the transmitter outputs a process variable. Generating characterization constants for these high order polynomials is costly and time consuming. Furthermore, this approach cannot optimally capture the real behavior of the non-linear process variables, which interact nonlinearly.

In addition to concerns of software and computational complexity, power consumption is critical for transmitters which receive all their operating power over the same wires used for communication. Furthermore, some "intrinsically safe" areas where transmitters are installed limit the transmitter's available power. The finite current budget not only limits the number and complexity of the calculations, but impacts the functionality able to be incorporated in the transmitter. For example, A/D converters could convert digitized sensor outputs more rapidly if more power were available, thereby increasing the transmitter update rate. An EEPROM large enough to accommodate all the characterization constants also consumes power which would otherwise provide additional functionality.

There is thus a need for an accurate method for compensating process variables which is computationally simple and requires small numbers of storm characterization constants, so as to consume a reduced amount of power and provide excess power for additional functionality and increased update rates in the transmitter.

SUMMARY OF THE INVENTION

In an embodiment, a measurement transmitter has a sensor for sensing a process variable (PV) such as pressure and digitizing means for digitizing an output representative of the sensed PV. The sensor senses the PV within a span of PV values. A memory inside the transmitter stores at least two membership functions, each membership function having a non-zero value over a predetermined region of the PV span and a substantially zero value over the remainder of the span. The memory also stores a set of compensation formulas, each formula corresponding to a membership function. A selection circuit in the transmitter selects those membership functions which have a non-zero ordinate at the value of the digitized PV and a correction circuit provides at least one correction value, each correction value calculated from a compensation formula corresponding to a selected membership function. A weighting circuit weights each correction value by the ordinate of the corresponding selected membership function, and combines the multiplicands to provide a compensated PV. The compensated PV is coupled to a control circuit connecting the transmitter to a control system.

A second embodiment includes a sensor for sensing a primary PV such as differential pressure, and other sensors for sensing secondary PVs such as line pressure and temperature. A set of converters digitize the sensed PVs. Each of the variables is assigned at least one membership function, with at least one of the variables having assigned at least two single dimensional membership functions. The membership functions having a substantially non-zero ordinate at the digitized PV values are selected, and compensation formulas corresponding to the selected membership functions are retrieved from a memory. An FAND circuit forms all unique three element combinations of the ordinates and provides the "rule strength" or minimum of the each of the combinations. A weighting circuit function perform in substantially the same way as described above to provide a compensated primary PV, which is formatted and coupled to a two wire circuit.

BRIEF DESCRIPTION OF THE DRAWINGS AND TABLE

Figure 2:
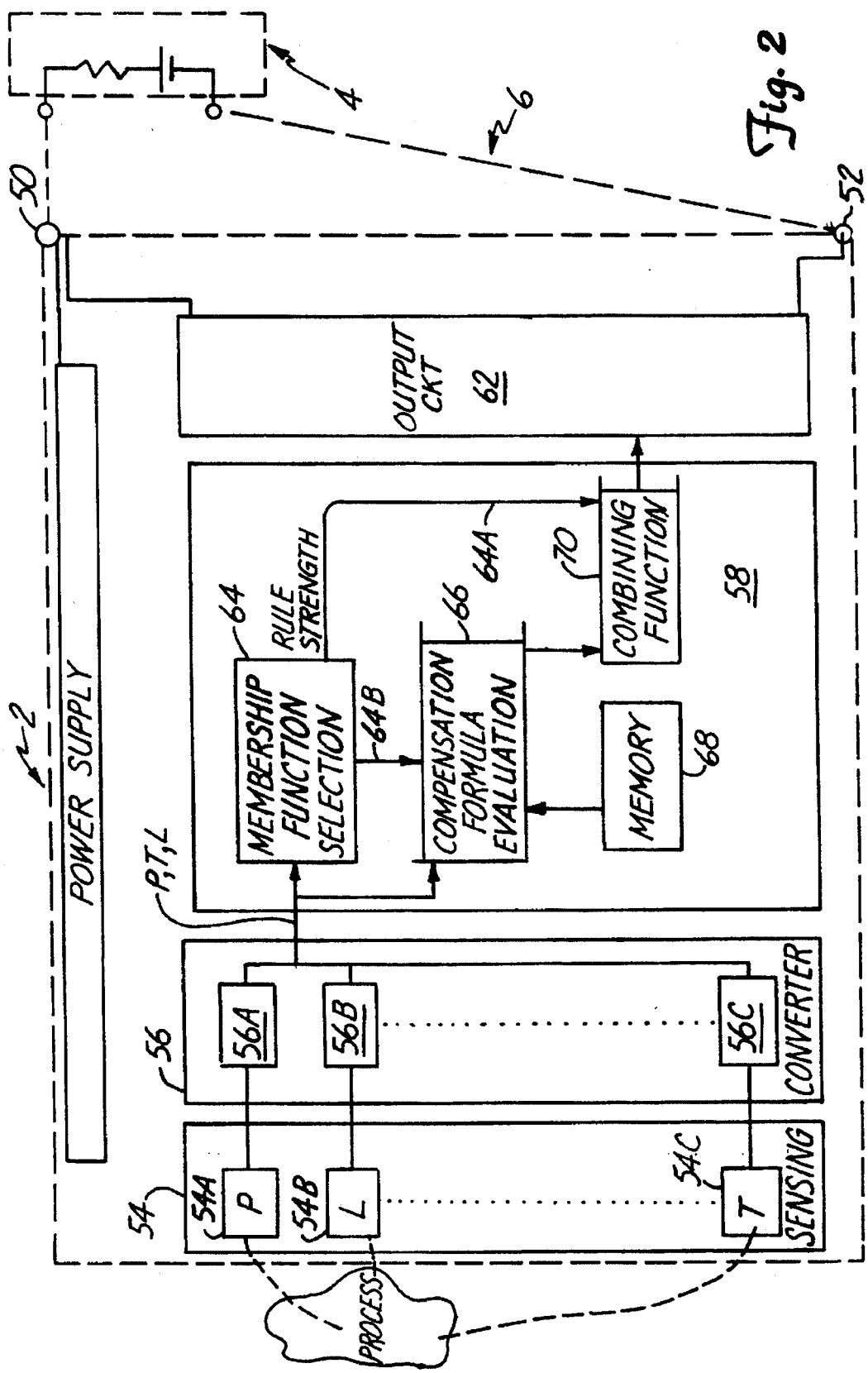
FIG. 2 is a block diagram of a transmitter made according to the present invention.
Figure 3A:
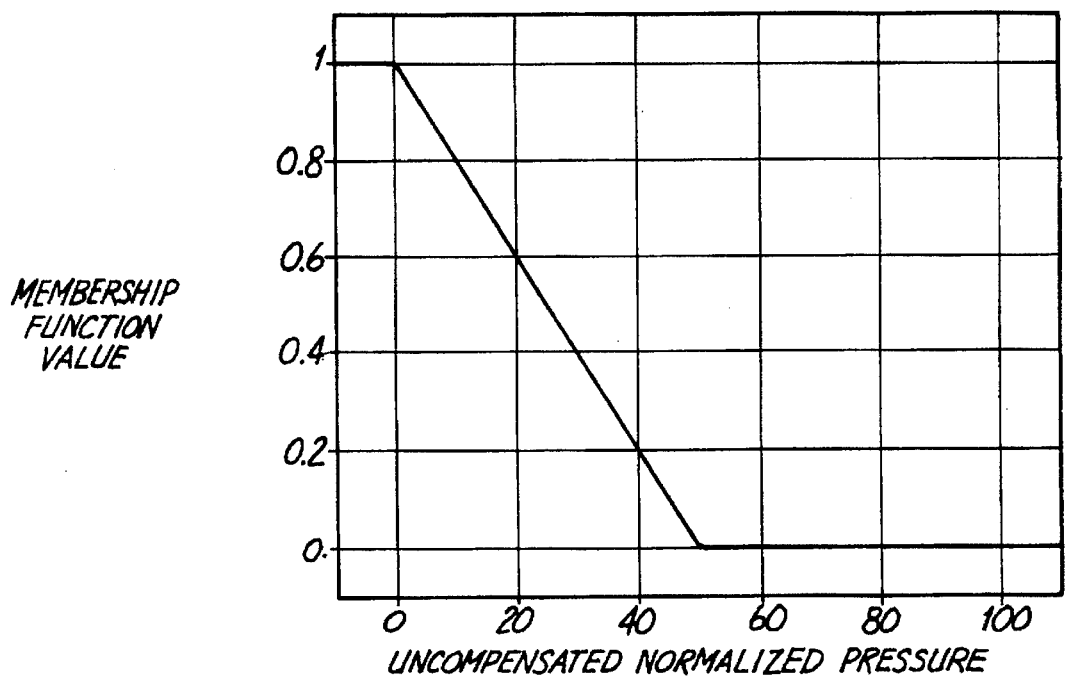
Figure 3B:
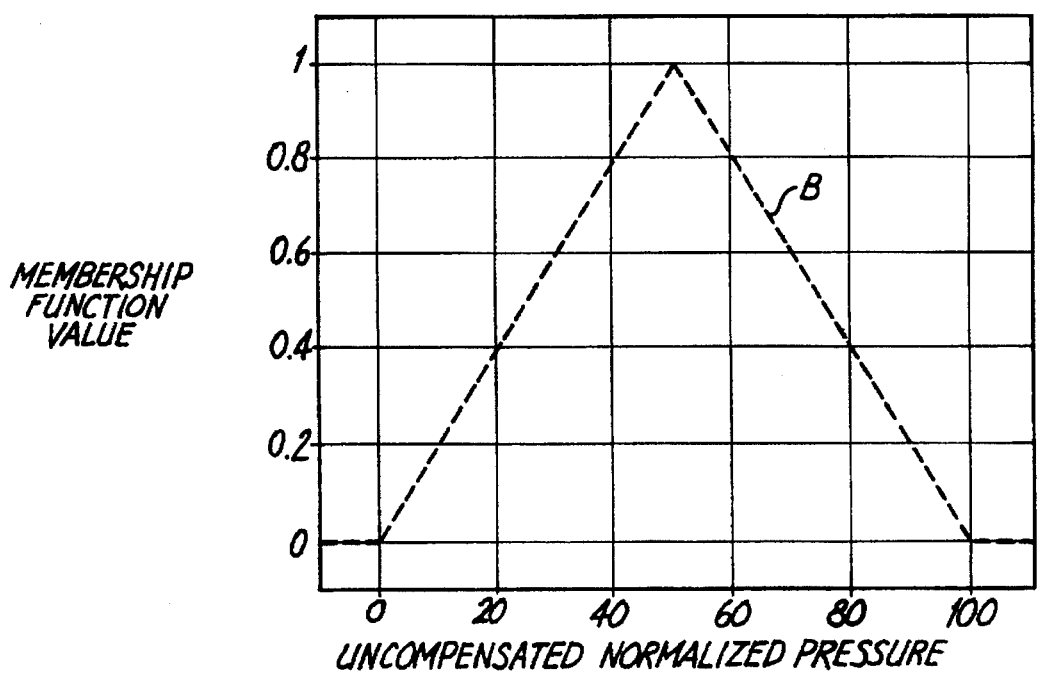
Figure 3C:
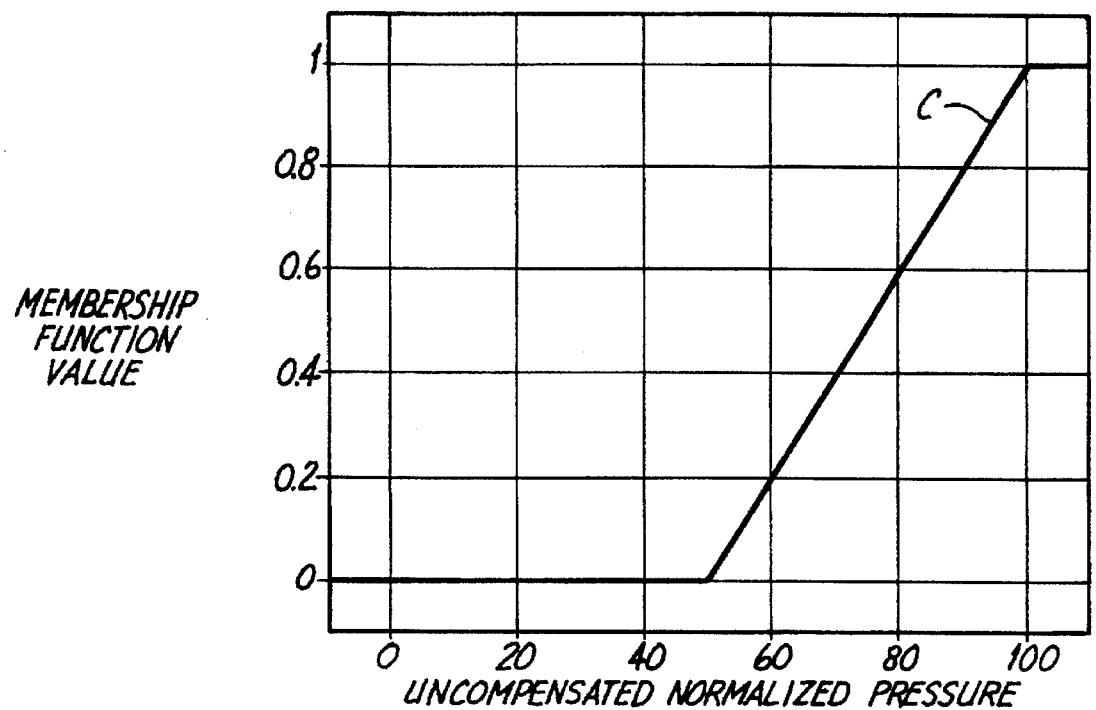
Figure 3D:
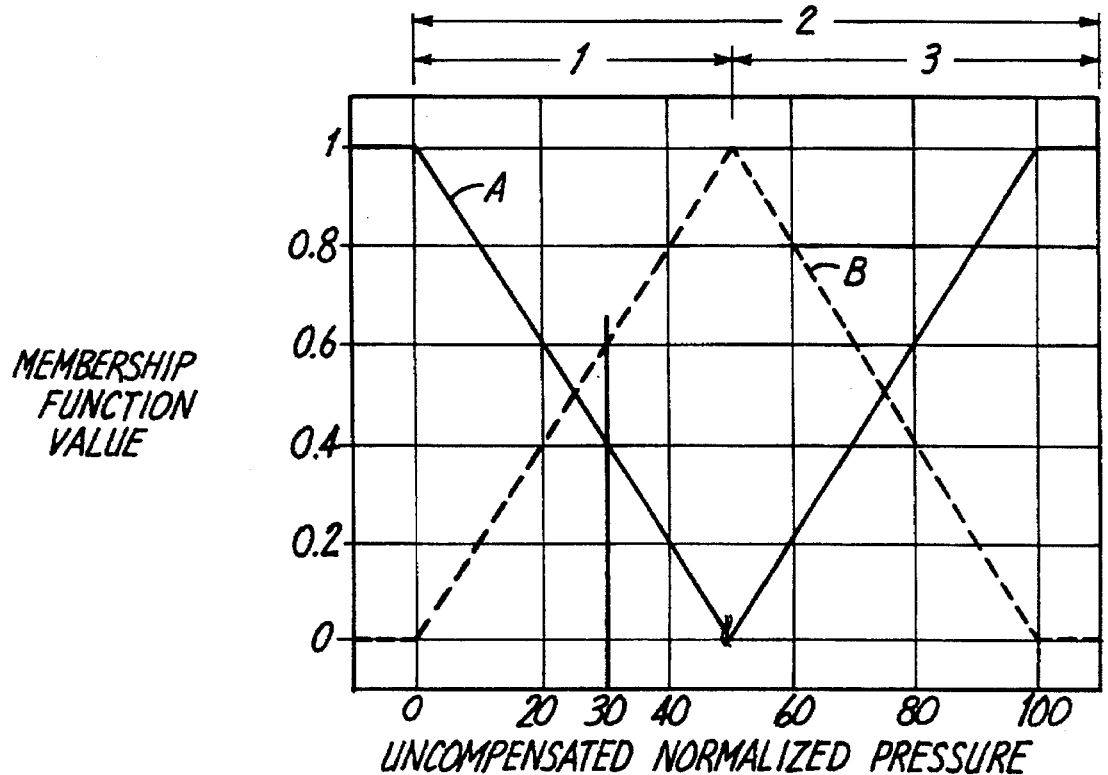
Figure 4:
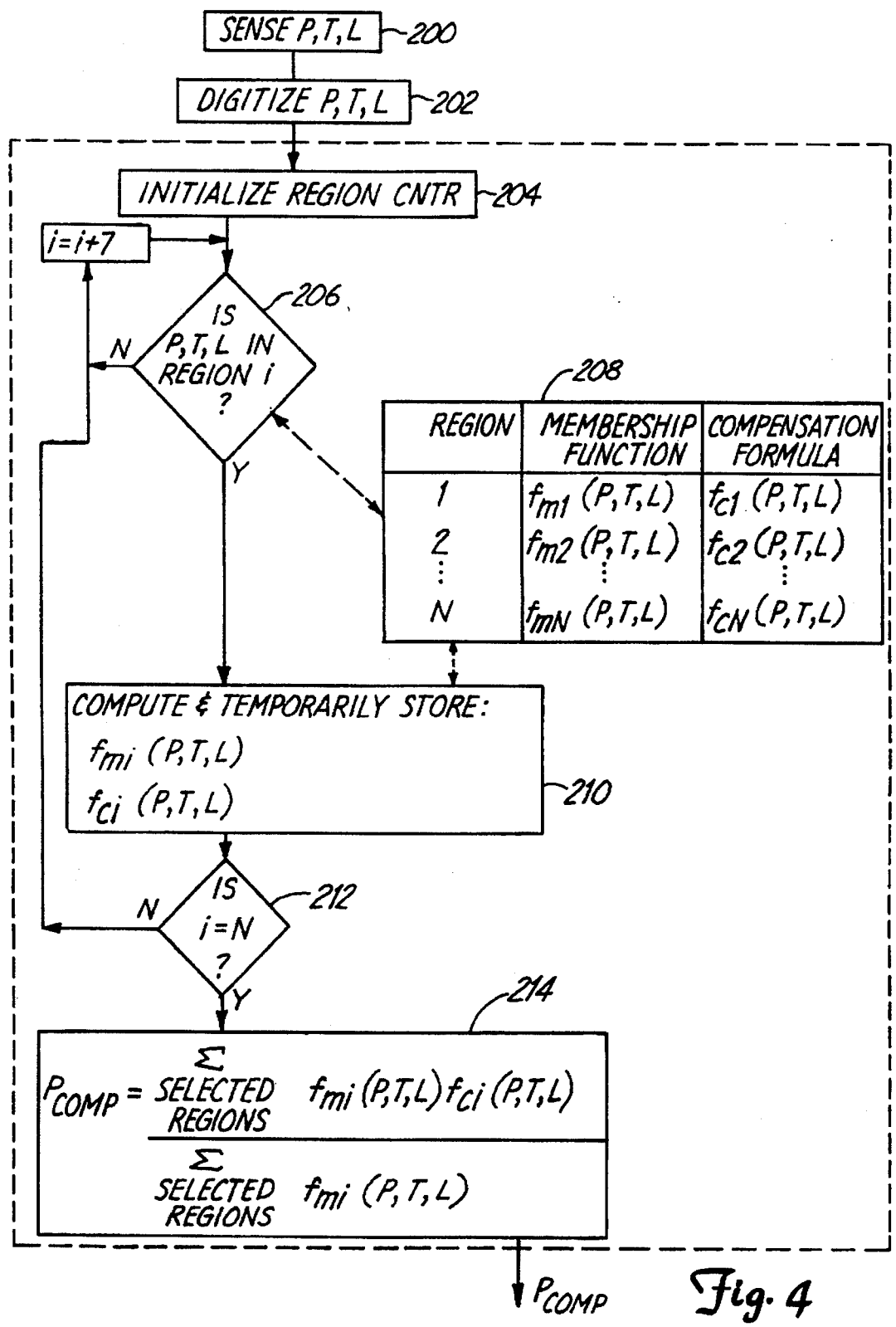
Figure 5:
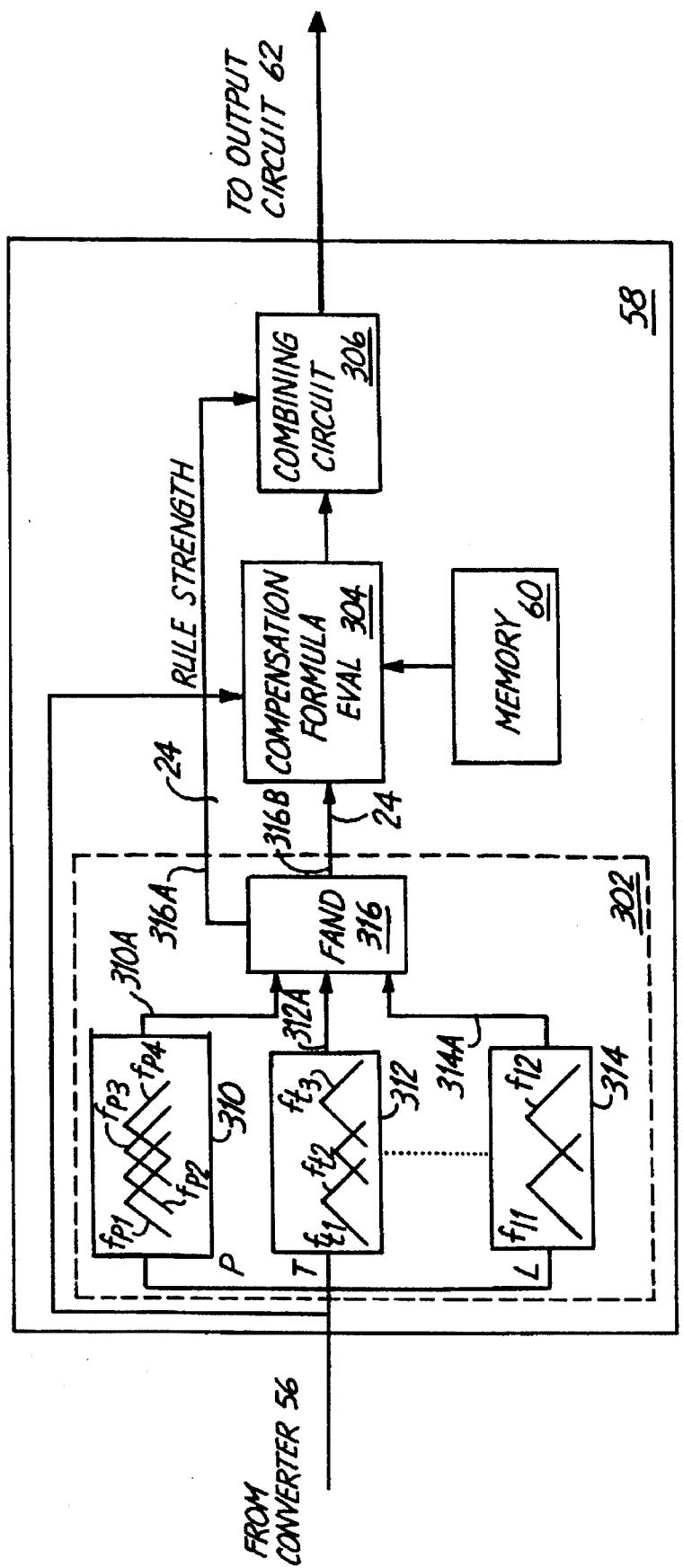
Figure 6:
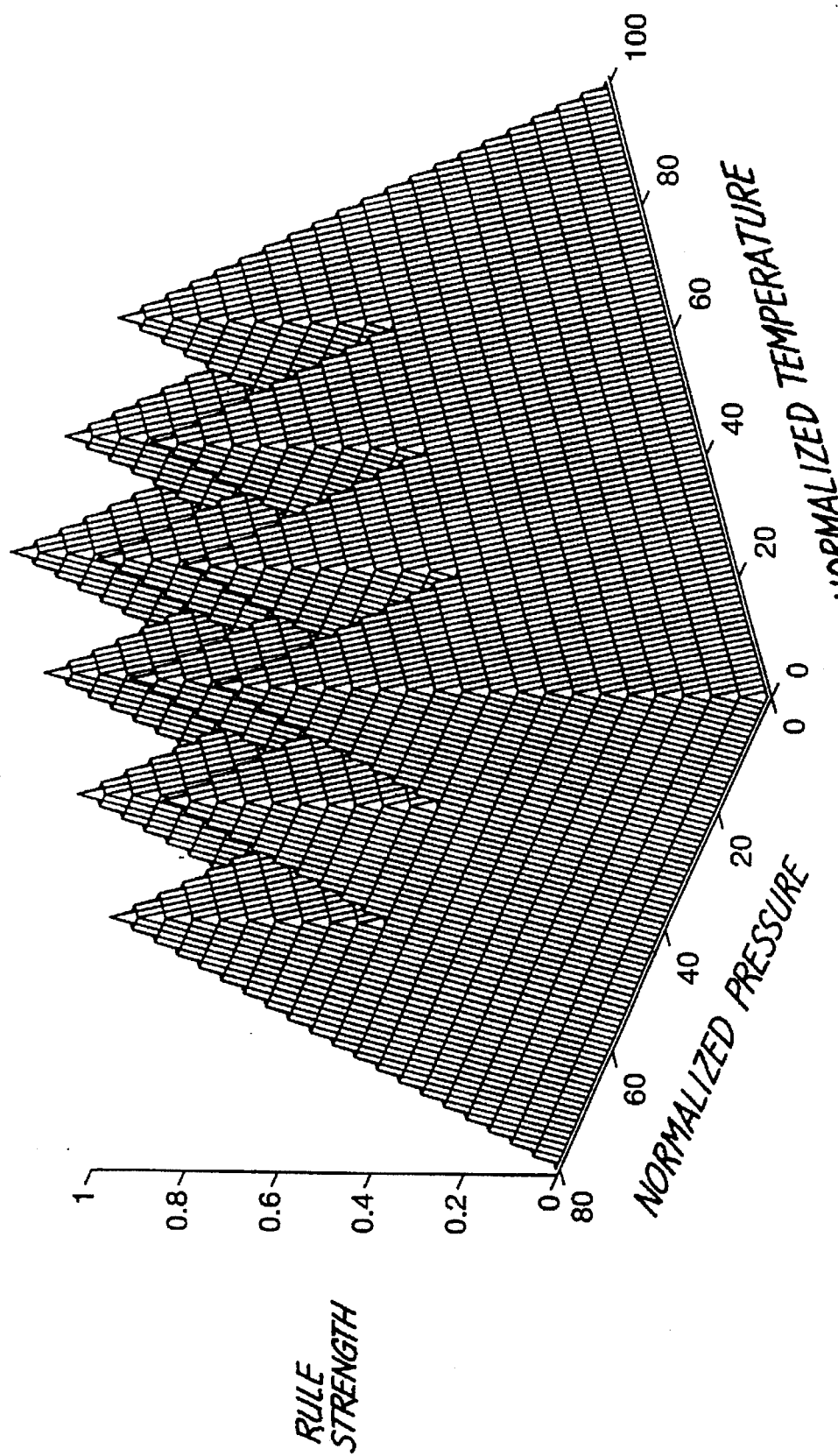
Figure 7B:
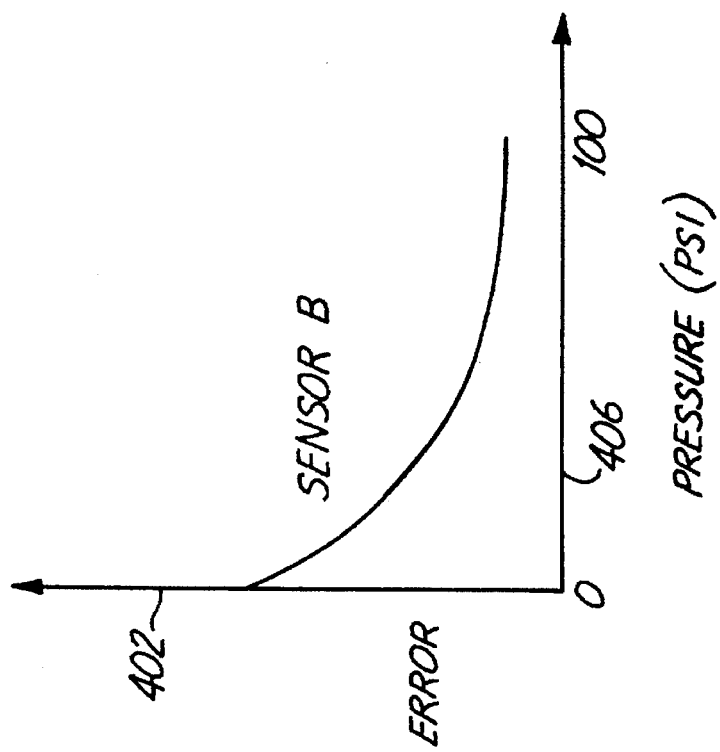
Figure 7A:
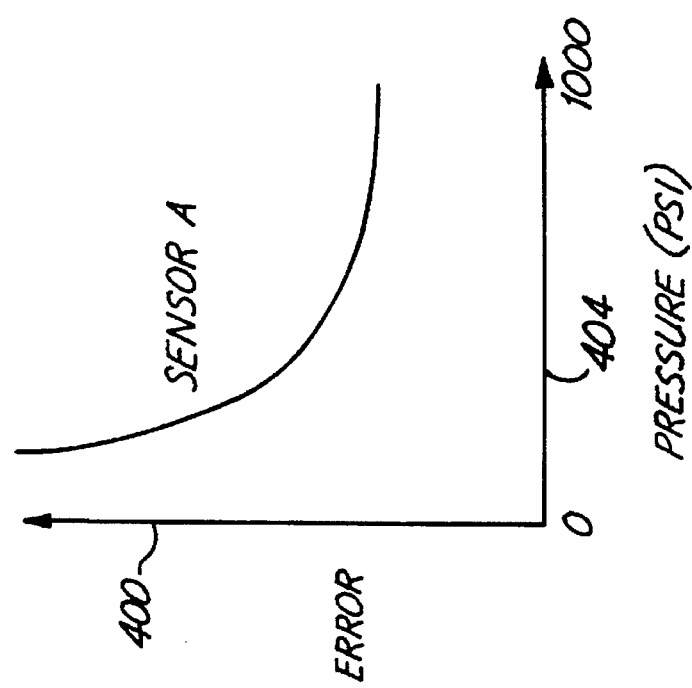

FIGS. 3A–C are plots of the three membership functions A–C respectively and FIG. 3D is a plot of the all three membership functions A–C, all shown as a function of uncompensated normalized pressure;

FIG. 4 is a flowchart of compensation circuit 58 in FIG. 2;

FIG. 5 is a block diagram of compensation circuit 58 with an alternative embodiment of membership function selection circuit 64;

FIG. 6 is a plot of a multidimensional membership functions;

FIG. 7A and FIG. 7B is a plot of the error as a function of pressure for two differential pressure sensors A and B.

TABLE 1 shows constants $K_1$ through $K_{10}$ for each of the three regions.

DETAILED DESCRIPTION OF THE PREFERRED EMBODIMENTS

Figure 1:
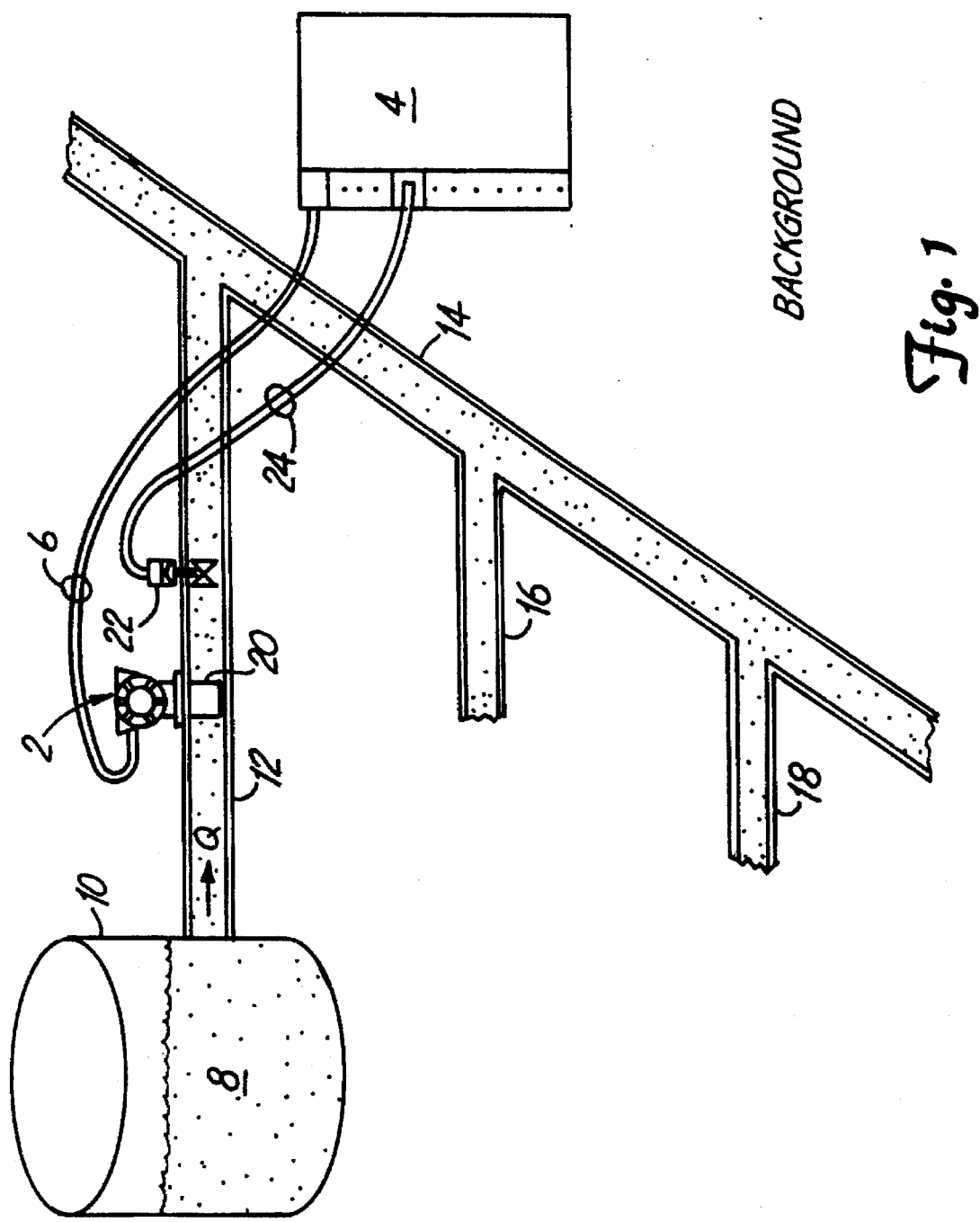
FIG. 1 is a sketch of a field mounted transmitter shown in a process control installation.

In FIG. 1, a pressure transmitter shown generally at 2 transmits an output representative of pressure to a digital control system (DCS) 4 via a two wire current loop shown generally at 6. A fluid 8 in a tank 10 flows through pipe 12 into a series of other pipes 14, 16 and 18, all containing fluid 8. Measurement transmitter 2 senses the pressure difference across an orifice plate 20 situated in the flow of fluid 8. The pressure difference is representative of the flow rate of fluid 8 in pipe 12. A valve 22 located downstream from transmitter 2 controls the flow in pipe 12 as a function of commands received from DCS unit 4 over another two wire loop 24. DCS unit 4 is typically located in a control room away from the process control field installation and in an explosion-proof and intrinsically safe area, whereas transmitter 2 and valve 22 are mounted directly onto pipe 12 in the field.

In FIG. 2, transmitter 2 is shown with two terminals 50, 52 which are couplable to two terminals of DCS 4 over twisted wire pair 6. DCS 4 is modeled as a resistance and a power supply in series and is shown generally at 4. Transmitter 2 has a sensor section 54 including a capacitance based differential pressure sensor 54A, an absolute pressure sensor 54B and a temperature sensor 54C. Transmitter 2 senses differential pressures between 0 and 250 inches of water. However, the types of process variables which transmitter 2 measures may include ones representative of position, volumetric flow, mass flow, temperature, level, density, displacement, pH, turbidity, dissolved oxygen and ion concentration. Analog output from sensors 54A–C is coupled to converter circuit 56, which includes voltage or capacitance based analog-to-digital (A/D) converters which can be of the type disclosed in U.S. Pat. Nos. 4,878,012, 5,083,091, 5,119,033 and 5,155,455, assigned to the same assignee as the present invention. Each of converters 56A–C generates a serial bitstream of 10 to 16 bits representative of the corresponding digitized process variable (PV) onto a bus connected to compensation circuit 58.

Compensation circuit 58 uses fuzzy logic to provide an output representing a compensated PV and typically comprises a microprocessor such as a Motorola 68HC05 with integrated memory. Circuit 58 compensates the errors in the digitized signal representing differential pressure with the digitized signals representing absolute pressure, temperature and differential pressure. Compensation circuit 58 is based on the premise that compensation is most accurately modelled by segmenting the variables to be compensated into multiple regions which overlap each other, where each region has assigned to it a simplified compensation formula optimized for that region and a membership function which can be multidimensional. The "strength" of the formula in the region is variable throughout the region and is described by the ordinate of the membership function at the value of the variable to be compensated. The ordinate of the membership function is typically a number between 0 and 100 percent, indicating the extent to which the value of the variable to be compensated can be modeled by the compensation formula assigned to the selected region. Compensation is determined by first selecting the regions which include the value of the variable to be compensated, and selecting the membership functions and compensation formulas corresponding to each selected region. The next step is to provide a set of correction values, by calculating each of the compensation formulas at the value of the variable to be compensated, and determining the strength of each correction value from the corresponding membership function. Finally, a compensation value is provided by combining the correction values, as weighted by the strength of the membership function at the variable value to be compensated.

A membership function selection circuit 64 selects which membership function is non-zero at the digitized P,T,L value and outputs signals representative of the selected membership functions on bus 64B. Circuit 64 also outputs ordinates of the selected membership functions at the digitized P,T,L values (the "rule strengths") at bus 64A. As a general rule, compensation circuit 58 includes at least two single dimensional membership functions for differential pressure, each overlapping the other. If more than one variable is used for compensation, there has to be at least two membership functions for one of the variables. FIGS. 3A–C show differential pressure membership functions A, B and C, each of which have a non-zero value over a different predetermined range of uncompensated pressures within the span. The variable to be compensated (differential pressure) is compensated by the all three variables (P, T and L), but only P is assigned membership functions. (In the most general case, each variable is assigned multiple membership functions.) Membership function A, shown as a solid line in FIG. 3A, has a non-zero value between 0 and 50% span and a zero value thereafter. Membership function B, shown as a dotted line in FIG. 3B, has a non-zero value between 0 and 100% span and a zero value elsewhere. Membership function C, shown as a solid line in FIG. 3C, has a non-zero value between 50% and 100% span and a zero elsewhere. FIG. 3D shows membership functions A, B and C plotted as a function of normalized pressure span. The non-zero segments of membership functions A, B and C define Regions 1, 2 and 3, respectively. The form of the equations need not be the same for each of the regions. The preferred form of the compensation formula for Regions 1–3 to meet the required accuracy with the metal cell DP sensor is given by Equation 1, which has a second order term as its highest term and requires no more that ten characterization constants.

$$P_{CORRECTED}(P,T,L) = K_1 + K_2P + K_3T + K_4L + K_5P^2 + K_6T^2 + K_7L^2 + K_8PL + K_9TP + K_{10}LT \quad (1)$$

Compensation formula evaluation circuit 66 evaluates and provides a correction value for each of the compensation formulas corresponding to the selected membership functions. The set of characterization constants for each of Regions 1–3 are stored in memory 68 and given below in

|       | REGION 1 | REGION 2 | REGION 3 |
|-------|----------|----------|----------|
| $K_1$ | −2.5152  | −3.4206  | −7.1604  |
| $K_2$ | 278.5154 | 283.4241 | 293.4994 |
| $K_3$ | −4.1357  | −2.3884  | −0.3094  |
| $K_4$ | 2.4908   | 2.5038   | 2.7488   |

-continued

|  | REGION 1 | REGION 2 | REGION 3 |
|---|---|---|---|
| $K_5$ | −3.4611 | −10.5786 | −17.4490 |
| $K_6$ | −4.1901 | −5.6594 | −6.9354 |
| $K_7$ | −0.1319 | −0.1589 | −0.2082 |
| $K_8$ | 11.9573 | 11.8335 | 11.4431 |
| $K_9$ | −9.3189 | −10.3664 | −11.5712 |
| $K_{10}$ | 1.1318 | 1.2281 | 1.3502 |

Memory 68 is a non-volatile memory containing membership functions, compensation formulas and characterization constants for the compensation formulas. Combining function circuit 70 receives the correction values and the rule strengths and provides a compensated P process variable according to the equation given by:

$$P_{comp} = \frac{\sum_{i=1}^{N} w_i f_{P_i}(P,T,L)}{\sum_{i=1}^{N} w_i} \quad (2)$$

where N is the number of selected regions, $W_i$ is the rule strength for the ith region, $f_i(P,T,L)$ is the correction value from the compensation formula corresponding to the ith region and $P_{comp}$ represents the compensated differential pressure.

Output circuit 62 receives and formats the compensated differential pressure PV and couples it to terminals 50, 52 for transmission over process control loop 6. Output circuit 62 may be realized in several ways. A first alternative is a digital-to-analog circuit where the compensated PV is converted to an analog current representative of the compensated PV and is thereafter coupled onto current loop 6. A second alternative is a fully digital transmission, such as Fieldbus, of the compensated PV onto loop 6. A third implementation superimposes a digital signal representative of the PV on an analog current also representative of the PV, such as in the HART® protocol.

The number and the functional form of the membership functions are determined by the compensation accuracy required (e.g. 0.05% accuracy) and the sensor's operating characteristics. For example, a sensor with a significant amount of error which must be compensated requires more membership functions than does a sensor which substantially meets the required amount of accuracy. Membership functions for the sensor which needs more compensation may each have a different functional form (e.g. exponential, gaussian, polynomial, constant, cubic spline, gaussian and logarithmic).

Consider a pressure of approximately 30% of span, corresponding to an applied pressure of 75.0 inches of water, indicated on FIG. 3D by a solid vertical line and included in the non-zero segments of membership function A and B. Membership functions A and B, corresponding to Regions 1 and 2 are the "selected membership functions". The values of the two membership functions at 30% of span are 0.359 and 0.641, respectively. The compensation formulas for Region 1 and 2 are given by Equation 3 and 4:

$$f_{P_1}(P,T,L) = -2.512 + 278.5154P - 4.137T + 2.4908L - 3.4611P^2 - 4.1901T^2 - 0.1319L^{**}2 + 11.9573PL - 9.3189TP + 1.1318LT \quad (3)$$

$$f_{P_2}(P,T,L) = -3.4206 + 283.4241P - 2.3884T + 2.5038L - 10.5786P^2 - 5.694T^{}2 - 0.1589L^{}2 + 11.8335PL - 10.3664TP + 1.2281LT \quad (4)$$

Correction values from Equation 3 and 4 are 75.188 and 75.070 inches of water, respectively. The compensated pressure is provided by a combining function, given by Equation 2 above, and is 75.112 inches of water, simplified from:

$$P_{comp} = \frac{.359(75.188) + .641(75.070)}{.359 + .641} \quad (5)$$

The T and L values substituted into the above equation correspond to room temperature and atmospheric line pressure.

Rather than executing a single eleventh order polynomial as in the prior art, only two second order polynomials are computed. The resulting correction value from the second order function is insensitive to the manner in which computation takes place (e.g. no overflows), requires less execution time, takes fewer characterization constants and provides more space in memory for additional software functionality in transmitter 2. Another benefit of a fuzzy logic implementation of compensation circuit 58 is to capture the effect of non-linear interaction between variables, which is difficult to model in a prior art single polynomial compensation scheme. The types of variables adapted for use in the disclosed compensation scheme are not limited to sensed PVs. The variable may be a time dependent variable, such as the first or second derivative, or the integral, of the variable. In this case, the corresponding membership function would be arranged to provide minimal compensation when the derivative is large (i.e. the magnitude of the compensation is insignificant compared to the magnitude of the pressure change, so it is adequate to approximately compensate the primary PV). Optimal value stem actuation by a positioner or actuator, such as in a pick and place machine, requires a sensed position and may include a velocity and an acceleration. Another type of variable is a "history dependent" variable, where effects of hysteresis are taken into account. History dependent PVs include information about the previous measurements taken with the specific sensor in transmitter 2. For example, extreme overpressurization of a capacitive based pressure sensor modifies its capacitance as a function of pressure in subsequent measurements. Different compensation formulas apply depending on the severity and frequency of the overpressurization. Another type of variable is a "position dependent" variable, where the value of the variable changes with position, such as in a diaphragm having one stiffness when bowed and another stiffness in the absence of applied pressure. Another type of variable is a "device dependent" variable, where the membership functions and compensation formulas change with the materials used to manufacture transmitter 2. For example, a sensor sensing pressure within a low pressure range has different compensation requirements than does a high range pressure sensor. Similarly, a pressure sensor with a diaphragm made of HASTELLOY® has different error characteristics, and hence requires different compensation, than does one made of MONEL®.

The present invention solves inaccuracies in a prior art compensation technique called piecewise linear fitting. In piecewise linear fitting, the span of the variable of interest is segmented into two or more ranges, and a linear equation is selected for each range which optimally fits each of the ranges. Unfortunately, there are typically small discontinuities, or mismatches, at the boundaries between the separately compensated ranges. The present compensation scheme, with the overlapping membership functions, provides a smooth transition between ranges of the variable of interest.

In FIG. 4, a flowchart of the functions in compensation circuit 58 is disclosed. The process variables P,T,L are sensed and digitized in blocks 200 and 202 respectively. A counter for counting the number of regions is initialized in block 204. A decision block 206 retrieves the ith membership function from a memory block 208 and determines whether the digitized P,T,L value is in the ith region described by the ith membership function. If the digitized point is included in the region, a computation block 210 retrieves appropriate compensation formulas and characterization constants from memory 208 to compute the ordinate value of a membership function $f_{mi}$(P,T,L) and a correction value $f_{ci}$(P,T,L) computed from the ith compensation formula, or otherwise increments the region counter i. Decision block 212 causes the loop to re-execute until all the regions which include the digitized P,T,L point are selected. Then block 214 computes the compensated differential pressure as indicated.

FIG. 5 details an alternative embodiment of membership function selection circuit 64. Exactly as in FIG. 2, fuzzy compensation circuit 58 receives digitized differential pressure (P), digitized absolute line pressure (L) and digitized temperature (T), and uses those three variables to provide a compensated differential pressure. The three main functional blocks are a rule strength circuit 302, a compensation formula evaluation circuit 304 and a combining circuit 306. However, in this alternative embodiment, all of the three variables (P,T,L) are assigned multiple membership functions. In particular, differential pressure is assigned four membership functions defined as $f_{p1}$, $f_{p2}$, $f_{p3}$ and $f_{p4}$; temperature is assigned three membership functions defined as $f_{t1}$, $f_{t2}$, and $f_{t3}$; and absolute pressure is assigned two membership functions defined as $f_{l1}$ and $f_{l2}$. Circuit 58 is preferably implemented in a CMOS microprocessor (with adequate on-chip memory), so as to conserve power in the transmitter, which receives power solely from the current loop.

Circuit 310 receives the digitized P value and selects those membership functions which have a non-zero ordinate at the digitized P value. Because the non-zero portions of the membership functions may overlap, there is usually more that one selected membership function for each digitized PV. When the membership functions overlap each other by 50%, $2^N$ equations are computed where N is the number of variables which are divided into more than one membership functions corresponding to the digitized P value, and is labelled at 310A. For example, if the digitized P value were included in the non-zero portion of three of the four P membership functions, then circuit 310 outputs three values, each value being an ordinate of the three selected membership functions corresponding to the digitized P value. Specifically for P=$p_0$, bus 310A includes the ordinates: [$f_{p2}(p_0)$, $f_{p3}(p_0)$, $f_{p4}(p_0)$]. At about the same time so as to be effectively simultaneous, circuit 312 receives the digitized T value and selects temperature membership functions having a non-zero value at the digitized T value. If the digitized T value were included in the non-zero portion of two of the three T membership functions, then circuit 312 outputs two values on bus 312A, each value being an ordinate of a selected membership function. Specifically for T=$t_0$, bus 312A includes the ordinates: [$f_{t2}(t_0)$, $f_{t3}(t_0)$]. In similar fashion, circuit 314 receives the digitized L value and selects absolute pressure membership functions having a non-zero value at the digitized L value. If the digitized L value were included in both of the two L membership functions, then circuit 314 outputs two values on bus 314A, each value being an ordinate of a selected membership function. Specifically for L=$l_0$, bus 314A includes the ordinates: [$f_{11}(l_0)$, $f_{12}(l_0)$].

Fuzzy AND circuit 316 forms all unique three element combinations of the ordinates it receives from circuits 310–314 (where each combination includes one value from each of the three busses 310A, 312A and 314A) and outputs the fuzzy AND (the minimum) of each of the unique combinations on a bus 316A. For the set of P, T and L values from the example above, the set of unique membership function ordinate combinations is:

$[f_{p2}(p_0) f_{t2}(t_0) f_{11}(l_0)]$ $[f_{p2}(p_0) f_{t2}(t_0) f_{12}(l_0)]$ $[f_{p2}(p_0) f_{t3}(t_0) f_{11}(l_0)]$ $[f_{p2}(p_0) f_{t3}(t_0) f_{12}(l_0)]$ $[f_{p3}(p_0) f_{t2}(t_0) f_{11}(l_0)]$ $[f_{p3}(p_0) f_{t2}(t_0) f_{12}(l_0)]$ $[f_{p3}(p_0) f_{t3}(t_0) f_{11}(l_0)]$ $[f_{p3}(p_0) f_{t3}(t_0) f_{12}(l_0)]$ $[f_{p4}(p_0) f_{t2}(t_0) f_{11}(l_0)]$ $[f_{p4}(p_0) f_{t2}(t_0) f_{12}(l_0)]$ $[f_{p4}(p_0) f_{t3}(t_0) f_{11}(l_0)]$ $[f_{p4}(p_0) f_{t3}(t_0) f_{12}(l_0)]$

The effect of the fuzzy AND circuit 316 is to take single variable membership functions for P, T and L and create multivariable membership functions in P-T-L space. Although it cannot be rendered graphically, circuit 316 creates in P-T-L space a set of 24 three-variable membership functions from the four P, three T and two L single-dimensional membership functions. There are 24 compensation formulas corresponding to the 24 membership functions. In general, the number of multivariable membership functions created is equal to the product of the number of membership functions defined for each individual variable. FIG. 6 gives an example of multivariable membership functions in two variables, P and T. Twelve overlapping pentahedrally shaped two-variable membership functions are defined in P-T space from four triangularly shaped P membership functions and three triangularly T membership functions. Each multivariable membership function corresponds to a compensation formula, and the ordinate of the multivariable membership function (the output of the fuzzy AND) is called a "rule strength" which describes the extent to which the compensated pressure can be modelled with the corresponding compensation formula.

Circuit 316 selects those compensation formulas corresponding to each "rule strength" output on bus 316B. Bus 316B has as many signals in it as there are compensation formulas. A "one" value corresponding to a specific compensation formula indicates that it is selected for use in compensation formula evaluation circuit 304. In our specific example, each of the twelve rule strengths defines a point on the surface of twelve separate pentahedrons, so that twelve compensation formulas (out of a total of 24) are selected.

Memory 308 stores the form and the characterization constants for each of the compensation formulas. Compensation formula evaluation circuit 304 retrieves the constants for the selected compensation formulas indicated via bus 316B from memory 308, and calculates a correction value corresponding to each of the selected compensation formulas. Combining circuit 306 receives the correction values and the rule strengths for each of the selected regions and weights the correction values by the appropriate rule strength. The weighted average is given by Equation 4. The characterization constants stored in memory 308 are the result of a weighted least squares fit between the actual operating characteristics of the sensor and the chosen form of the compensation formula for that compensation formula. (The weighted least squares fit is performed during manufacture, rather than operation of the unit.) The weighted least squares fit is given by:

$$b = P^{-1} s \qquad (6)$$

where b is a n×1 vector of calculated characterization coefficients, P is the n×n weighted covariance matrix of the input data matrix X and s is the n×1 weighted covariance vector of X with y. The data matrix X is of dimension m×n where each row is one of m data vectors representing one of the m (P,T,L) characterization points.

In an alternate embodiment of compensation circuit 58 shown in FIG. 5, FAND circuit 316 is obviated and membership function circuits 310–314 are replaced by three explicitly defined three dimensional membership functions having the form of a radial basis function given generally by:

$$R_i(X) = \exp\left[ -\frac{\|X - x_i\|^2}{\sigma_i^2} \right] \qquad (7)$$

In the radial basis function, X is a three dimensional vector whose components are the digitized P, T and L values, $x_i$ is a three dimensional vector defining the center of the function in P-T-L space, and $\sigma$ controls the width of the function. A set of multidimensional membership functions, such as with radial basis functions, effectively replaces the function of FAND circuit 316, since the FAND circuit provides a set of multidimensional membership functions from sets of single dimensional membership functions.

The present invention is particularly suitable when used in a transmitter with dual differential pressure sensors. FIG. 7A and FIG. 7B shows the sensor error on the respective y axes 400,402 plotted as a function of sensed differential pressure on x axes 404,406 for two pressure sensors A and B (labelled), each connected as shown for pressure sensor 54A in FIG. 2. Sensor A senses a wide range of pressures between 0 and 1000 PSI, while sensor B senses pressure over a tenth of the other sensor's span; from 0 to 100 PSI. The error for sensor A is greater at any given pressure than the error for sensor B at the same pressure. A dual sensor transmitter as described here has an output representative of the converted output from sensor B at low pressures, but switches to an output representative of the converted output from sensor A over higher pressures. The present compensation scheme provides a smooth transmitter output when the transmitter switches between the sensors A and B. In the same fashion as disclosed in FIGS. 3A–D, the output from sensor A is treated as one process variable and output from sensor B is treated as another process variable. As disclosed, each process variable has assigned to it a membership function and a compensation formula, which indicate the extent to which the process variable can be modelled by the compensation formula. A correction value is provided from computing each of the two compensation formulas, and a combining function weights the correction values and provides a compensated pressure. This is a preferred compensation scheme for dual sensor transmitters in that output from both sensors is used throughout a switchover range of pressures, (i.e. no data is discarded for pressures measured within the switchover range) with the relative weighting of the output from each sensor defined by each sensor's membership function. This applicability of the present compensation scheme to dual sensors applies equally well to transmitters having multiple sensors sensing the same process variable, and to transmitters with redundant sensors where each sensor senses a range of PVs substantially the same as the other.

Although the present invention has been described with reference to preferred embodiments, workers skilled in the art will recognize that changes may be made in form and detail without departing from the spirit and scope of the invention. The present invention can be applied to devices outside of the process control and process automation industry, and for example could be used to compensate control surface position in an airplane. The type of variables used in the compensation circuit can be other than PVs, the compensation formulas and membership functions can be of forms other than polynomials, and the combining function can be a non-linear averaging function.

What is claimed is:

1. A measurement transmitter, comprising:

conversion means for sensing a process variable related to pressure within a span of process variable values and for providing a digitized output representative of the sensed pressure process variable;

a memory for storing at least two membership functions, each membership function having a non-zero value over a predetermined region of the process variable span and a substantially zero value over the remainder of the span, and for storing a set of compensation formulas, each formula corresponding to a membership function;

selection means for selecting those membership functions which have a non-zero value at the digitized process variable;

correction means for providing at least one correction value, each correction value calculated from a compensation formula corresponding to a selected membership function;

weighting means for weighting each correction value by its corresponding selected membership function, and for combining the weighted correction values to provide a compensated process variable;

an output circuit for coupling the compensated process variable to a control circuit; and wherein there are at least three membership functions for the pressure process variable, the membership functions each having a center point corresponding to a maximum value of the membership function, where the center points are evenly spaced along the span of process variable values.

2. The transmitter of claim 1 where non-zero regions of two of the membership functions overlap each other.

3. The transmitter of claim 2 where the control circuit is a two wire current loop.

4. The transmitter of claim 3 where current in the loop has a magnitude representative of the compensated process variable.

5. The transmitter of claim 1 where the control circuit is a three wire circuit.

6. The transmitter of claim 1 where at least one membership function is triangularly shaped.

7. The transmitter of claim 1 where at least one membership function is a gaussian function.

8. The transmitter of claim 1 where the weighting means combine the correction values according to a weighted average.

9. The transmitter of claim 1 where at least one of the compensation formulas is a polynomial function.

10. The transmitter of claim 1 where the at least three membership functions each overlap at least one other membership function by 50%.

11. The transmitter of claim 1 where the conversion means include a differential pressure sensor and the conversion means provide a digitized representation of a variable related in time to the differential pressure.

12. The transmitter of claim 1 where the pressure process variable is a time dependent variable.

13. The transmitter of claim 12 where the time dependent variable is a first derivative.

14. The transmitter of claim 12 where the time dependent variable is a second derivative.

15. The transmitter of claim 12 where the time dependent variable is an integral.

16. The transmitter of claim 1 where the pressure process variable is a history dependent variable.

17. The transmitter of claim 1 where the pressure process variable is a position dependent variable.

18. The transmitter of claim 1 where the pressure process variable is a device dependent variable.

19. A transmitter in a process control system comprising:
   a sensor for sensing a physical variable in the system, the physical variable taking on values within a span of values, the sensor having an output representative of the physical variable within the span;
   digitizing means for digitizing the sensor output;
   selection and storing means for selecting a region from a set of regions in a different portion of the span, a region becoming selected when the sensor output is included within the region, each region having a compensation formula and a membership function corresponding thereto;
   computation means for retrieving the membership functions and the compensation formulas corresponding to the selected regions, and for providing the ordinates of the membership functions at the value of the sensor output and for providing the value of the compensation formulas at the value of the sensor output; and
   compensation means for weighting the value of the compensation formulas by the ordinate of the corresponding membership functions so as to provide a compensated transmitter output.

20. The transmitter of claim 19 where each variable is assigned at least one membership function and the weighting means further comprise:
   forming means for forming a combination of the ordinates of each of the selected membership functions, each combination comprising one ordinate related to each variable;
   a fuzzy AND circuit for selecting the minimum value in each of the combinations;
   where the weighting means weight each correction value by the ordinate of the corresponding membership functions to provide a compensated transmitter output.

21. The transmitter of claim 19 where an output circuit couples the compensated physical variable to a control circuit.

22. The transmitter of claim 21 wherein the transmitter couples to a two wire current loop.

23. The transmitter of claim 23 where current in the loop has a magnitude representative of the compensated physical variable.

24. The transmitter of claim 19 where non-zero regions of two of the membership functions overlap each other.

25. The transmitter of claim 19 where at least one membership function is triangularly shaped.

26. The transmitter of claim 19 where at least one membership function is a gaussian function.

27. The transmitter of claim 19 where at least one of the compensation formulas is a polynomial function.

28. The transmitter of claim 19 where the physical variable is selected from the group of physical variables consisting of differential pressure, position, volumetric flow, mass flow, temperature, level, density, displacement, pH, turbidity, dissolved oxygen and ion concentration.

29. The transmitter of claim 19 wherein the physical variable comprises differential pressure.

30. The transmitter of claim 29 where there are three membership functions for the differential pressure, the membership functions each having a center point corresponding to a maximum value of the membership function, where the center points are evenly spaced along the span of physical variables values.

31. The transmitter of claim 19 wherein the physical variable comprises level.

32. The transmitter of claim 19 wherein the physical variable comprises temperature.

33. The transmitter of claim 19 wherein the physical variable comprises flow.

34. The transmitter of claim 19 wherein the physical variable comprises position.

35. The transmitter of claim 19 where there are three membership functions each overlapping at least one other membership function by 50%.

36. The transmitter of claim 19 where the physical variable is a time dependent variable.

37. The transmitter of claim 36 where the time dependent variable is a first derivative.

38. The transmitter of claim 36 where the time dependent variable is a second derivative.

39. The transmitter of claim 36 where the time dependent variable is an integral.

40. The transmitter of claim 19 where the physical variable is a history dependent variable.

41. The transmitter of claim 19 where the physical variable is a position dependent variable.

42. The transmitter of claim 19 where the physical variable is a device dependent variable.

43. A measurement transmitter, comprising:
   conversion means for sensing a process variable related to temperature within a span of process variable values and for providing a digitized output representative of the sensed process variable;
   a memory for storing at least two membership functions, each membership function having a non-zero value over a predetermined region of the process variable span and a substantially zero value over the remainder of the span, and for storing a set of compensation formulas, each formula corresponding to a membership function;
   selection means for selecting those membership functions which have a non-zero value at the digitized process variable;
   correction means for providing at least one correction value, each correction value calculated from a compensation formula corresponding to a selected membership function;
   weighting means for weighting each correction value by its corresponding selected membership function, and for combining the weighted correction values to provide a compensated process variable;
   an output circuit for coupling the compensated process variable to a control circuit; and wherein there are three membership functions for the temperature process variable, the membership functions each having a center point corresponding to a maximum value of the membership function, where the center points are evenly spaced along the span of process variable values.

44. The transmitter of claim 43 where non-zero regions of two of the membership functions overlap each other.

45. The transmitter of claim 43 where the control circuit is a two wire current loop.

46. The transmitter of claim 45 where current in the loop has a magnitude representative of the compensated process variable.

47. The transmitter of claim 43 where the control circuit is a three wire circuit.

48. The transmitter of claim 43 where at least one membership function is triangularly shaped.

49. The transmitter of claim 43 where at least one membership function is a gaussian function.

50. The transmitter of claim 43 where the weighting means combine the correction values according to a weighted average.

51. The transmitter of claim 43 where at least one of the compensation formulas is a polynomial function.

52. The transmitter of claim 43 where the three membership functions each overlapping at least one other membership function by 50%.

53. The transmitter of claim 43 where the conversion means include a differential pressure sensor and the conversion means provide a digitized representation of a variable related in time to the differential pressure.

54. The transmitter of claim 43 where the temperature process variable is a time dependent variable.

55. The transmitter of claim 54 where the time dependent variable is a first derivative.

56. The transmitter of claim 54 where the time dependent variable is a second derivative.

57. The transmitter of claim 54 where the time dependent variable is an integral.

58. The transmitter of claim 43 where the temperature process variable is a history dependent variable.

59. The transmitter of claim 43 where the temperature process variable is a position dependent variable.

60. The transmitter of claim 43 where the temperature process variable is a device dependent variable.

61. A measurement transmitter, comprising:

conversion meads for sensing a flow process variable within a span of process variable values and for providing a digitized output representative of the sensed process variable;

a memory for storing at least two membership functions, each membership function having a non-zero value over a predetermined region of the flow process variable span and a substantially zero value over the remainder of the span, and for storing a set of compensation formulas, each formula corresponding to a membership function;

selection means for selecting those membership functions which have a non-zero value at the digitized process variable;

correction means for providing at least one correction value, each correction value calculated from a compensation formula corresponding to a selected membership function;

weighting means for weighting each correction value by its corresponding selected membership function, and for combining the weighted correction values to provide a compensated process variable;

an output circuit for coupling the compensated process variable to a control circuit; and wherein there are three membership functions for the flow process variable, the membership functions each having a center point corresponding to a maximum value of the membership function, where the center points are evenly spaced along the span of process variable values.

62. The transmitter of claim 61 where non-zero regions of two of the membership functions overlap each other.

63. The transmitter of claim 61 where the control circuit is two wire current loop.

64. The transmitter of claim 63 where current in the loop has magnitude representative of the compensated process variable.

65. The transmitter of claim 61 where the control circuit is a three wire circuit.

66. The transmitter of claim 61 where at least one membership function is triangularly shaped.

67. The transmitter of claim 61 where at least one membership function is a gaussian function.

68. The transmitter of claim 61 where the weighting means combine the correction values according to a weighted average.

69. The transmitter of claim 61 where at least one of the compensation formulas is a polynomial function.

70. The transmitter of claim 61 where the three membership functions each overlap at least one other membership function by 50%.

71. The transmitter of claim 61 where the conversion means include a differential pressure sensor and the conversion means provide a digitized representation of a variable related in time to the differential pressure.

72. The transmitter of claim 61 where the flow process variable is a time dependent variable.

73. The transmitter of claim 72 where the time dependent variable is a first derivative.

74. The transmitter of claim 72 where the time dependent variable is a second derivative.

75. The transmitter of claim 72 where the time dependent variable is an integral.

76. The transmitter of claim 61 where the flow process variable is a history dependent variable.

77. The transmitter of claim 61 where the flow process variable is a position dependent variable.

78. The transmitter of claim 61 where the flow process variable is a device dependent variable.

79. A measurement transmitter, comprising:

conversion means for sensing a level process variable within a span of process variable values and for providing a digitized output representative of the sensed process variable;

a memory for storing at least two membership functions, each membership function having a non-zero value over a predetermined region of the level process variable span and a substantially zero value over the remainder of the span, and for storing a set of compensation formulas, each formula corresponding to a membership function;

selection means for selecting those membership functions which have a non-zero value at the digitized process variable;

correction means for providing at least one correction value, each correction value calculated from a compensation formula corresponding to a selected membership function;

weighting means for weighting each correction value by its corresponding selected membership function, and for combining the weighted correction values to provide a compensated process variable;

an output circuit for coupling the compensated process variable to a control circuit; and wherein there are three membership functions for the level process variable, the membership functions each having a center point corresponding to a maximum value of the membership function, where the center points are evenly spaced along the span of process variable values.

80. The transmitter of claim 79 where non-zero regions of two of the membership functions overlap each other.

81. The transmitter of claim 79 where the control circuit is a two wire current loop.

82. The transmitter of claim 81 where current in the loop has a magnitude representative of the compensated process variable.

83. The transmitter of claim 79 where the control circuit is a three wire circuit.

84. The transmitter of claim 79 where at least one membership function is triangularly shaped.

85. The transmitter of claim 79 where at least one membership function is a gaussian function.

86. The transmitter of claim 79 where the weighting means combine the correction values according to a weighted average.

87. The transmitter of claim 79 where at least one of the compensation formulas is a polynomial function.

88. The transmitter of claim 79 where the three membership functions each overlap at least one other membership function by 50%.

89. The transmitter of claim 79 where the conversion means include a differential pressure sensor and the conversion means provide a digitized representation of a variable related in time to the differential pressure.

90. The transmitter of claim 79 where the level process variable is a time dependent variable.

91. The transmitter of claim 90 where the time dependent variable is a first derivative.

92. The transmitter of claim 90 where the time dependent variable is a second derivative.

93. The transmitter of claim 90 where the time dependent variable is an integral.

94. The transmitter of claim 79 where the level process variable is a history dependent variable.

95. The transmitter of claim 79 where the level process variable is a position dependent variable.

96. The transmitter of claim 79 where the level process variable is a device dependent variable.

* * * * *

UNITED STATES PATENT AND TRADEMARK OFFICE
CERTIFICATE OF CORRECTION

PATENT NO. : 5,642,301
DATED : June 24, 1997
INVENTOR(S) : Jogesh Warrior et al.

It is certified that error appears in the above-indentified patent and that said Letters Patent is hereby corrected as shown below:

Col. 5, lines 17-22, change $$"P_{comp} = \frac{\sum_{i=1}^{N} w_i f_{P_i}(P,T,L)}{\sum_{i=1}^{N} w_i}"$$

to $$-- P_{comp} = \frac{\sum_{i=1}^{N} w_i f_{P_i}(P,T,L)}{\sum_{i=1}^{N} w_i} --$$

Col. 13, line 26, change "overlapping" to --overlap--.

Col. 13, line 47, change "meads" to --means--.

Col. 14, line 14, after "is" insert --a--.

Col. 14, line 16, after "has" insert --a--.

Signed and Sealed this

Seventh Day of July, 1998

*Attest:*

BRUCE LEHMAN

*Attesting Officer*  *Commissioner of Patents and Trademarks*